US010932096B2

(12) United States Patent
Sonobe

(10) Patent No.: US 10,932,096 B2
(45) Date of Patent: Feb. 23, 2021

(54) RELAYING DEVICE, VOICE COMMUNICATION SYSTEM, VOICE SIGNAL TRANSFER METHOD, AND NON-TRANSITORY COMPUTER-READABLE RECORDING MEDIUM

(71) Applicant: ICOM INCORPORATED, Osaka (JP)

(72) Inventor: Hirotaka Sonobe, Osaka (JP)

(73) Assignee: ICOM INCORPORATED, Osaka (JP)

( * ) Notice: Subject to any disclaimer, the term of this patent is extended or adjusted under 35 U.S.C. 154(b) by 0 days.

(21) Appl. No.: 16/481,993

(22) PCT Filed: Feb. 2, 2018

(86) PCT No.: PCT/JP2018/003507
§ 371 (c)(1),
(2) Date: Jul. 30, 2019

(87) PCT Pub. No.: WO2018/147170
PCT Pub. Date: Aug. 16, 2018

(65) Prior Publication Data
US 2019/0394620 A1    Dec. 26, 2019

(30) Foreign Application Priority Data

Feb. 8, 2017  (JP) .............................. JP2017-021645

(51) Int. Cl.
*H04W 4/08*    (2009.01)
*H04B 7/14*    (2006.01)
(Continued)

(52) U.S. Cl.
CPC ................ *H04W 4/08* (2013.01); *H04B 7/14* (2013.01); *H04M 3/56* (2013.01); *H04W 4/10* (2013.01); *H04W 84/12* (2013.01)

(58) Field of Classification Search
CPC ......... H04W 4/08; H04W 4/10; H04W 84/12; H04B 7/14; H04M 3/56; H04M 3/00; H04M 3/42; H04L 65/4061
See application file for complete search history.

(56) References Cited

U.S. PATENT DOCUMENTS 9,307,370 B1    4/2016  Pai
2002/0077136 A1*  6/2002  Maggenti ............ H04L 63/0428
                                                        455/518
(Continued)

FOREIGN PATENT DOCUMENTS

CN    102196367 A    9/2011
CN    105684404 A    6/2016
(Continued)

OTHER PUBLICATIONS

English Translation of International Search Report of PCT/JP2018/003507 dated Mar. 6, 2018.
(Continued)

*Primary Examiner* — Ankur Jain
(74) *Attorney, Agent, or Firm* — Muncy, Geissler, Olds & Lowe, P.C.

(57) ABSTRACT

[Problem] To provide a relaying device and a voice communication system with which calling and listening among a plurality of talk groups is possible.
[Solution] The relaying device is provided with: a relaying device which stores a plurality of groups and terminal devices belonging to each of the groups, and, when a voice signal is received from one or more of the terminal devices (calling terminal devices), transfers the voice signal to the terminal devices other than the calling terminal device in the group to which the calling terminal device belongs; and the plurality of terminal devices which are connected to the relay device over a communication network. The relaying device also stores the master-slave relationship among the
(Continued)

plurality of groups, transfers the voice signal to the terminal devices belonging to a master group if the group to which the calling terminal device belongs is a slave group, and transfers the voice signal to the terminal devices belonging to slave groups if the group to which the calling terminal device belongs is the master group.

5 Claims, 10 Drawing Sheets

(51) Int. Cl.
*H04M 3/56* (2006.01)
*H04W 4/10* (2009.01)
*H04W 84/12* (2009.01)

(56) References Cited

U.S. PATENT DOCUMENTS

| 2016/0269546 A1 | 9/2016 | Matsushima | |
|---|---|---|---|
| 2016/0286365 A1 | 9/2016 | Matsushima | |
| 2017/0019164 A1* | 1/2017 | Sonobe | H04B 7/14 |

FOREIGN PATENT DOCUMENTS

| CN | 105706430 A | 6/2016 | |
|---|---|---|---|
| WO | WO-2015133021 A1 * | 9/2015 | H04B 7/14 |
| WO | 2016/084459 A1 | 6/2016 | |

OTHER PUBLICATIONS

Office Action for the corresponding CN application No. 201880005401.2 dated Nov. 3, 2020 and machine English translation thereof.

\* cited by examiner

| DESTINATION | | TRANSMISSION SOURCE | | VOICE DATA | DATA BODY | |
|---|---|---|---|---|---|---|
| IP ADDRESS | PORT NUMBER | IP ADDRESS | PORT NUMBER | | COMMUNICATION CONTROL INFORMATION | |
| | | | | | CALLING TYPE | CALLED DESTINATION ID | CALLING SOURCE ID |

Fig. 3

| CALLING TYPE | CALLED DESTINATION ID | TERMINAL INFORMATION | MASTER-SLAVE RELATIONSHIP |
|---|---|---|---|
| INDIVIDUAL | 001 | - | - |
| ... | ... | ... | ... |
| INDIVIDUAL | 033 | - | - |
| GROUP | TG1 | 001,002,003 | 01 MASTER |
| GROUP | TG2 | 011,012,013 | 01 SLAVE |
| GROUP | TG3 | 021,022,023 | 01 SLAVE |
| GROUP | TG4 | 031,032,033 | - |
| PLENARY | A | 001,002,003, 011,...,033 | - |

Fig. 6A

| SESSION ID | PARTICIPATION ID | MASTER-SLAVE RELATIONSHIP | HOLD TIME (TS) |
|---|---|---|---|
| 033 | 031,033 | - | 1500 |
| TG1 | 001,002,003 | 01 MASTER | 1500 |
| TG2 | 011,012,013 | 01 SLAVE | 1500 |
| TG3 | 021,022,023 | 01 SLAVE | 1500 |

Fig. 6B

RELAYING DEVICE, VOICE COMMUNICATION SYSTEM, VOICE SIGNAL TRANSFER METHOD, AND NON-TRANSITORY COMPUTER-READABLE RECORDING MEDIUM

TECHNICAL FIELD

The present invention relates to a voice communication system using a network such as wireless LAN.

BACKGROUND ART

The applicant proposes a voice communication system using wireless LAN (LAN transceiver system) in the Patent Literature 1. The LAN transceiver system is provided with a plurality of terminal devices (voice communication device) and a server. The server is installed on the network including wireless LAN so that the terminal device can access to wireless LAN. The plurality of terminal devices is registered on the server. A user can perform a voice communication by using the terminal device like a conventional wireless transceiver by the server which transfers voices of the plurality of terminal devices mutually.

The user can perform a group communication by using the plurality of terminal devices of the LAN transceiver system due to registering a talk group to which the plurality of terminal devices belong on the server by a system administrator. Moreover, in the LAN transceiver system, the user of the terminal device can make a talk group (user group), other than the talk group which is registered by the system administrator, and register it on the server as he intended.

CITATION LIST

[Patent Literature 1] International Publication WO/2016/084459

Problems to be Solved by Invention

At the group communication in the abovementioned system, the terminal devices belonging to the talk group pre-registered on the server only can talk to each other. Thus, even the terminal device belonging to a management talk group for an administrator or the like, for example, voice of another talk group to which the terminal device does not belong can not be listened. Moreover, the terminal device can not call two talk groups together.

The present invention has an object to provide the relaying device and the voice communication system allowing the terminal device to call and to listen the plurality of talk groups.

SUMMARY OF INVENTION

A relaying device according to the present invention is provided with a network communication unit, a storage unit, and a control unit. The network communication unit is connected to a communication network and can communicate with a plurality of terminal devices over the communication network. The storage unit stores a plurality of groups and the terminal devices belonging to each of groups, and further stores master-slave relationship of the plurality of groups. The control unit, in receiving a voice signal from any of one or a plurality of the terminal devices (hereinafter, referred to as calling terminal device), transfers the voice signal to the terminal device other than the calling terminal device in the group to which the calling terminal device belongs (hereinafter, referred to as other terminal device). Moreover, the control unit further transfers the voice signal to the terminal device belonging to a master group when the group to which the calling terminal device belongs is a slave group and further transfers the voice signal to the terminal device belonging to the slave group when the group to which the calling terminal device belongs is the master group.

In the abovementioned invention, the storage unit stores the master-slave relationship associated a plurality of slave groups with one master group, and the control unit may transfer the voice signal received from the calling terminal device belonging to the master group to the terminal devices belonging to all the slave groups subordinating to the master group.

In the abovementioned invention, when the control unit receives the voice signal from the calling terminal device belonging to the master group, the control unit generates a mixing group to which all the terminal devices of the master group belong and mixing groups each of which all the terminal devices in each of all the slave groups subordinating to the master group respectively belong to. And then, the control unit transfers the voice signal to other terminal devices in the master group (after mixing the voice signal with other voice signal to be transmitted), and inputs the voice signal to all the slave groups and transfers the voice signal to all the terminal devices in each of the slave groups (after mixing the voice signal with other voice signal to be transmitted). When the voice signal is received from the calling terminal device belonging to the slave group, the control unit generates a mixing group of the slave group and a mixing group of the master group to which the slave group belongs, transfers the voice signal to other terminal devices in the slave group (after mixing the voice signal with other voice signal to be transmitted), and inputs the voice signal to the master group and transfers the voice signal to all the terminal devices in the master group (after mixing the voice signal with the other voice signal to be transmitted).

In the abovementioned invention, the control unit releases the mixing group to which all the terminal devices in the master group belong when the control unit does not receive the voice signal for a predetermined time from the terminal device belonging to the master group and the terminal device belonging to any of slave groups. And the control unit releases the mixing group to which all the terminal devices in the slave group belong when the control unit does not receive the voice signal for a predetermined time from the terminal device belonging to the slave group and the terminal device belonging to the master group to which this slave group subordinates.

The voice communication system according to the present invention has a relaying device storing the plurality of groups and the terminal device belonging each of group, in receiving the voice signal from any of one or plurality of the terminal devices (hereinafter, calling terminal device), transfers the voice signal to the terminal device other than the calling terminal device in the group to which the calling terminal device belongs, and the plurality of the terminal devices connected to the relaying device over the communication network. The relaying device further stores the master-slave relationship of the plurality of the groups, and when the group to which the calling terminal device belongs is the slave group, the voice signal is also transferred to the terminal device belonging to the master group, and when the group to which the calling terminal device belongs is the master group, the voice signal is transferred to the terminal device belonging to the slave group.

A transfer method of the voice signal according to the present invention comprises the network communication unit connected to the communication network and communicating with the plurality of the terminal device over the communication network, and the storage unit storing the plurality of the group, the terminal device belonging to each of the groups, and the master-slave relationship of the plurality of the group, and when the voice signal is received from any of one or the plurality of the terminal device (hereinafter, calling terminal device), the relaying device transferring the voice signal to the terminal device other than the calling terminal device in the group to which the calling terminal device belongs performs the processing described below. When the group to which the calling terminal device belongs is the slave group, the relaying device transfers the voice signal to the terminal device belonging to the master group, and the group to which the calling terminal device belongs is the master group, the relaying device transfers the voice signal to the terminal device belonging to the slave group.

A program according to the present invention includes the network communication unit connected with the communication network and communicating with the plurality of terminal devices over the communication network, and the storage unit storing the plurality of the groups, the terminal device belonging to each of the groups, and master-slave relationship of the plurality of groups, and when the voice signal is received from one or more of the plurality of the terminal devices (hereinafter, calling terminal device), the program makes the control unit of the relaying device transferring the voice signal to the terminal device other than the calling terminal device in the group to which the calling terminal device belongs function as a group communication means. The group communication means transfers the voice signal to the terminal device belonging to a master group when the group to which the calling terminal device belongs is a slave group, and further transfers the voice signal to the terminal device belonging to the slave group when the group to which the calling terminal device belongs is the master group.

Advantageous Effect of Invention

According to the present invention, a calling or a listening of a plurality of talk groups having set a master-slave relationship is enabled.

BRIEF DESCRIPTION OF DRAWINGS

FIG. 3 shows a diagram showing an example configuration of a voice packet.

FIG. 6A shows a diagram of a call destination table set in the server.

FIG. 6B shows a diagram of a mixing table generated by the server.

DETAILED DESCRIPTION OF THE EMBODIMENT

Figure 1:
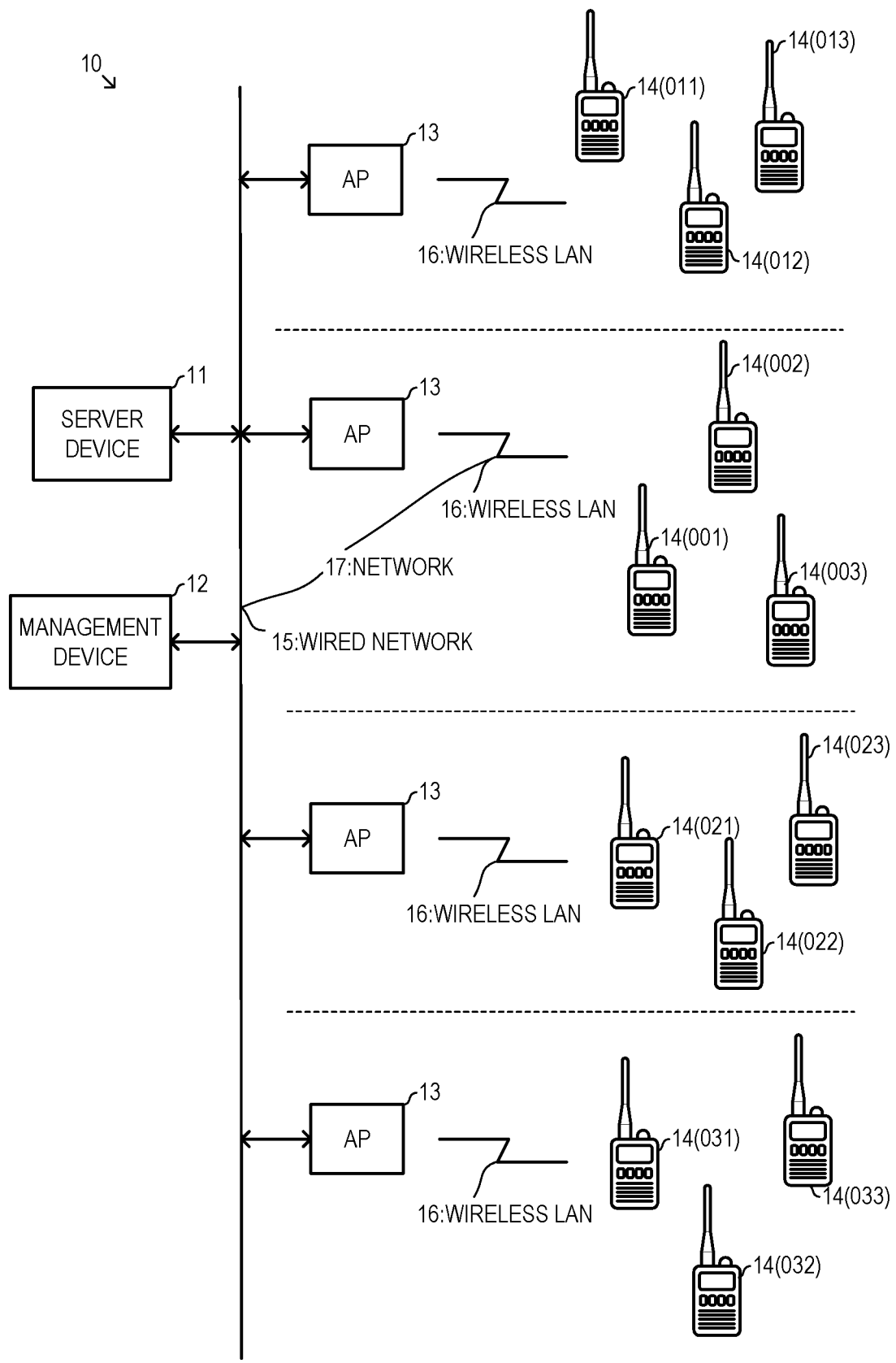
FIG. 1 shows a structural diagram of a voice communication system which is an embodiment of the present invention.
Figure 2:
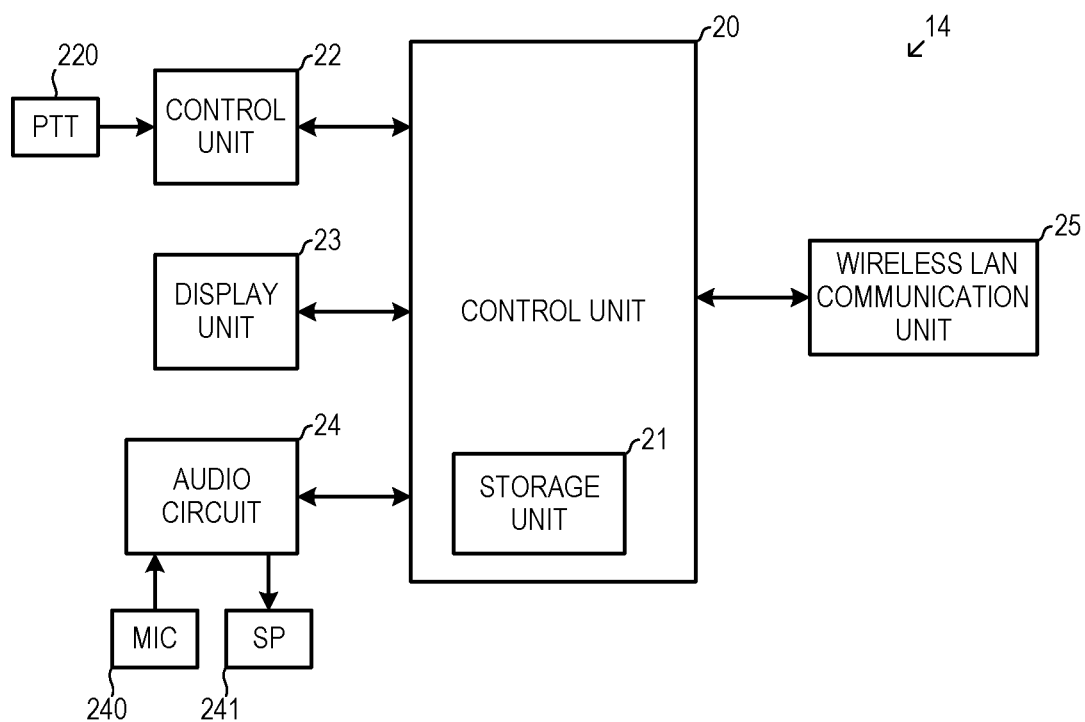
FIG. 2 shows a block diagram of a transceiver, a terminal device.

A voice communication system of an embodiment of present invention will be described by referring to drawings. FIG. 1 shows a structural diagram of the voice communication system 10. The voice communication system 10 enables a mutual communication among a plurality of terminal devices 14 with a wireless LAN (local area network) 16 such as Wi-Fi. A terminal device 14 has similar appearance to a handy transceiver for wireless communication and is provided with a PTT (push to talk) switch 220 as shown in FIG. 2. The terminal device 14 is a wireless network device transceiving (transmitting and receiving) a voice packet via a wireless access point (AP) 13 in functional aspect. A server 11, a relaying device, relays mutual communication of the terminal devices 14 over a wired network 15 and the wireless LAN 16. In the following description, the wired network 15 and the wireless LAN 16 are collectively called a network 17.

As the wired network 15, LAN configured by Ethernet (registered trademark) or Internet is applicable. By using VPN, secure communication is available over the Internet. Also, a communication method conforming to IEEE802.11 such as Wi-Fi is adoptable for the wireless LAN 16. The terminal device 14 and the wireless access point 13 communicate by the communication method.

The terminal device 14 can perform an individual communication, a group communication, and a plenary communication. In the individual communication, the terminal device 14 performs one to one communication by specifying a communication partner (a remaining terminal device 14). In the group communication, the terminal device 14 performs communication with the terminal device 14 belonging to a preset talk group. In the plenary communication, the terminal device performs communication with all the communicable terminal devices 14 connected with the network 17. The talk group has a fixed group and a user group. The fixed group is a group previously registered in the server 11 by a system administrator. The user group is a group in which only a group flame has preset in the server 11 and to which terminal device 14 belonging has not decided, and the group belonging to every terminal device 14 is individually set (including the situation not to belong any of the group) by choice of a user. Both the fixed group and the user group have same function in the voice communication. In the following description, the fixed group and the user group are collectively called as the talk group or the group.

In the FIG. 1, the servers 11 is connected to the wired network 15. When voice signals are simultaneously input from a plurality of the terminal devices 14 in the group communication, the server 11 mixes the voice signals into a mixed voice signal and transfers the mixed voice signal. This realizes full duplex communication at the group communication. The mixed voice signal is generated from the voice signals of the terminal devices other than that which the mixed voice signal is transferred to so that not to echo by receiving a voice signal transmitted from the terminal devices 14 itself. This processing is called as an echo elimination mixing. The server 11 performs the echo elimination mixing for each of the terminal devices 14 respectively and transfers the mixed voice signal to each of the terminal device 14.

The voice communication system 10 is not limited to a configuration shown in FIG. 1. The number of the server 11 is not limited one, for example, and may be equal or more than two. The number of the terminal device 14 is not further limited to 12. However, the number of connectable terminal device 14 may be limited to approximately 100 to each server 11 in accordance with processing capability of the server 11.

In FIG. 1, a management device 12 is connected to the wired network 15. The management device 12 is consisted of a personal computer installed a management program and the like, for example. The management device 12 accesses the server 11 in responsive to an operation of an administrator and sets a call destination table and the like to the server 11 (see FIG. 6A).

FIG. 2 shows a block diagram of the terminal device 14. As described above, the terminal device is the wireless network device transceiving a voice packet via a wireless access point (AP) 13 in terms of function. A control unit 2 is configured with a microprocessor, which controls an operation of the device. The control unit 20 has a storage unit 21 storing various type of data. The storage unit 21 stores a configuration data. The configuration data includes a call destination ID communicable in this terminal device and the like. The control unit 20 is connected to an operation unit 22, a display unit 23, an audio circuit 24, and a wireless LAN communication unit 25. The operation unit 22 includes a key switch such as a PTT switch 220 to receive a user operation and inputs an operation signal of the user operation to the control unit 20. The display unit 23 includes a liquid crystal display. The liquid crystal display displays such as an ID number of a communication partner selected by the user operation and an ID number of a calling communication partner.

The audio circuit 24 has a microphone 240 and a speaker 241. The control unit 20 decodes a received voice packet to the voice signal and inputs the voice signal to the audio circuit 24. The audio circuit converts this decoded audio signal into an analog signal and outputs from the speaker 241. The audio circuit 24 further converts the voice signal input from the microphone 240 into a digital signal and inputs the digital signal to the control unit 20. The control unit 20 makes this digital audio signal into the voice packet and inputs the voice packet to the wireless LAN communication unit 25. The wireless LAN communication unit 25 communicates wirelessly in the communication method conforming to IEEE 802.11 described above. The wireless LAN communication unit 25 transmits the voice packet input from the control unit 20 to the wireless access point 13 and inputs the voice packet received from the wireless access point 13 to the control unit 20.

When the user inputs the voice toward the microphone 240 holding the PTT switch 220, the terminal device 14 edits this voice signal into the voice packet and then transmits the voice packet to the server 11. The terminal device further has a VOX circuit. The VOX circuit is a circuit deciding whether the voice signal (voice of the user) is input or not in accordance with an input level of the microphone 240 and duration. The VOX circuit switches the terminal device into transmission status (PTT switch ON status) deciding the voice signal is input. The terminal device 14 may switch ON/OFF of transmission with the VOX circuit in place of the PTT switch 220 or together with the PTT switch 220.

As the terminal device 14 is a packet communication device via the wireless LAN 16, the terminal device 14 can transmit and receive the voice packet simultaneously. This function makes the terminal device enable full duplex communication. However even if during full duplex communication, the terminal device 14 edits and transmits the voice packet only decided the voice signal to be transmitted is input by the PTT switch 220 or a VOX function so as not to continuously transmit a silent voice packet.

A configuration of the voice packet will be described by referring to FIG. 3. The voice packet has a destination IP address, a destination port number, a header information including a calling source IP address and a calling source port number, and a payload which is a data body. The payload includes the voice signal (voice data) and a communication control information. In the voice packet, the voice signal is converted into the voice data by digitized and divided into one thread (20 milliseconds, for example). The destination IP address and the calling source IP address included in the header are IP address indicating direct destination and a transmission calling source of this voice packet. The communication control information included in the payload is information identifying a communication session and includes a calling type, a call destination ID and a calling source ID. The calling type is information indicating a communication mode and shows any of an individual communication, a group communication or a plenary communication. The call destination ID is consisted of a terminal number of the communication partner in the individual communication and consisted of a group number in the group communication. In the calling source ID, the terminal number of the terminal device 14 being the calling source is written in the individual communication and no information is written in the group communication and the plenary communication.

The server 11 takes the payload out from the voice packet when the voice packet is received from the terminal device 14. The server decides a transfer destination of the voice signal in accordance with the communication control information included in the payload, makes new voice packet with the voice signal included in the payload, and transmits the new voice packet to the transfer destination. A processing such as mixing of a plurality of voice signals is then performed if required. The terminal device 14 does not require a SIP processing and the like to establish communication with the communication partner as the transfer destination of the voice signal is decided in accordance with the communication control information included in the payload and the IP address of terminal devices 14 and the group is managed by the server 11. After selecting the communication partner by the user operation of the terminal device 14, the user can push the PTT switch 220 and immediately start talking with the terminal device 14, thus the user can perform the communication with feeling of use similar to a transceiver for wireless communication.

The terminal device 14 downloads a setting information from the server 11 in starting of operation (in turning power ON). The setting information includes a call destination authorized to own device. The authorized call destination is displayed in turn on the display unit 23 in the terminal device 14 by user operation. The user can start the voice communication with the call destination (individual/group/plenary) by selecting a desired call destination and turning the PTT switch 220 ON or by starting a speech toward the microphone 240.

Figure 4:
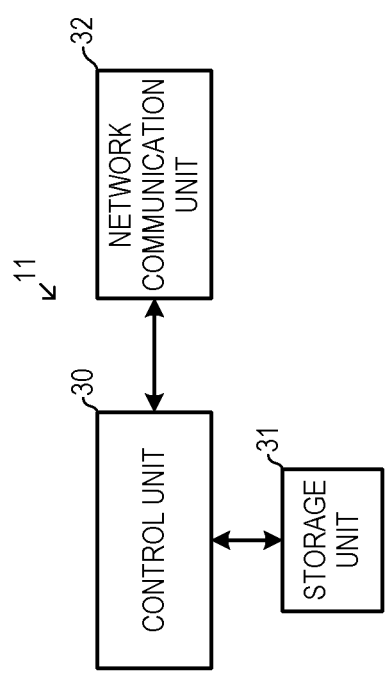
FIG. 4 shows a block diagram of a server.

FIG. 4 is a block diagram of the server 11. The server 11 transmits the voice signal received from the terminal device 14 to a remaining terminal device 14 as described above. The server 11 has the control unit 30, the storage unit 31 and a network communication unit 32. The storage unit 31 is configured with a hard disk or a RAM, for example, and stores the call destination table shown in FIG. 6A, a mixing table shown in FIG. 6B, the setting data of each of the terminal devices 14 and the like. The control unit 30 performs mixing of the voice signal, setup of the terminal device 14 in starting and the like. The network communication unit 32 is connected to the wired network 15 and controls communication over the network 17.

Figure 5:
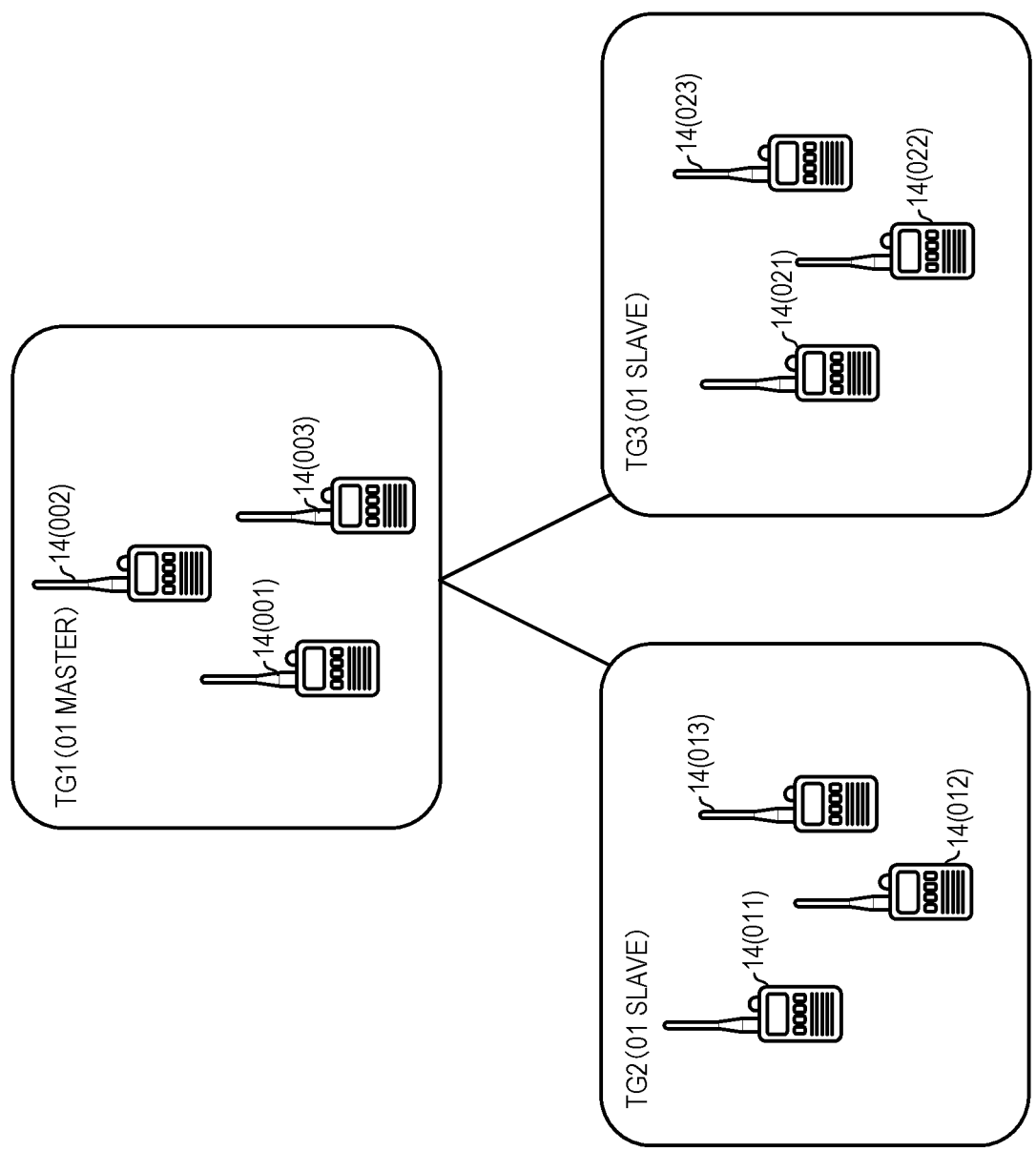
FIG. 5 shows a diagram of a master-slave relationship among talk groups of terminal devices.

A transfer processing of the voice signal in the group communication is now described with referring a diagram shown a master-slave relationship of a talk group TG in FIG. 5 and the mixing table in FIG. 6B. It should be noted that the terminal device 14 having transmitted the voice signal may be described as a calling terminal device 14 and the terminal device 14 to be called may be described as a call destination terminal device 14. In the example shown in FIG. 5 and FIG. 6A, four talk groups, TG1 to TG 4, are set and the master-slave relationship are set in the talk groups TG1, TG2 and TG3. The talk group TG 4 is an independent talk group not having the master-slave relationship with other talk groups. The talk group TG1 is the talk group for management to which the terminal device for the administrator belongs and has an authority (function) listening the communication of subordinating talk groups TG2 and TG3. The terminal devices 14 having terminal numbers from 001 to 003 belong to the talk group TG1 for management. The talk groups TG2 and TG3 are normal talk groups. The terminal devices 14 having the terminal ID from 011 to 013 belong to the talk group TG2. The terminal devices 14 having the terminal ID from 021 to 023 belong to the talk group TG3.

The talk group TG1 is a master group (01 master: status of the master group in a master-slave relationship 01) and the talk groups TG2 and TG3 are slave groups against the master group TG1 (01 slave: status of the slave group in the master-slave relationship 01).

An association between the master group and the slave group is set to the server 11 by the administrator. Any talk groups irrespective of the fixed group or the user group can be set as the master group or the slave group. However, it can be restricted which group is settable for the master group (or for the slave group). Namely, "the master group can be set only the user group" and the like.

When the terminal device 14 belonging to any of the talk group TG having set the master-slave relationship performs a group calling (calling to perform the group communication in an own belonging group), a calling voice is transmitted to the terminal device 14 in the talk group TG to which the terminal device performing a group calling itself belongs and further transmitted to the terminal device 14 in another talk group TG having the master or the slave relationship with the talk group TG. Likewise, the terminal device 14 in the another talk group TG can respond to the group calling. Namely, the group calling from the terminal device 14 belonging to the master group is further transferred to all the terminal devices 14 in the slave group which subordinate to the master group. The group calling from the terminal device 14 belonging to the slave group is further transferred to the terminal device 14 in the master group to which this slave group subordinates.

The group communication is performed when another terminal device 14 responds to this calling. The voice signal in the group communication is further transferred to the terminal device 14 in other talk group in accordance with the master-slave relationship. Namely, the voice signal transmitted from the terminal device 14 belonging to the master group is transferred to the terminal devices 14 in the belonging master group and all the slave groups. The voice signal transmitted from the terminal device 14 belonging to the slave group is transferred to the terminal device in the belonging slave group and the master group.

A view from each terminal device 14 side is described as follow. The voice signal mixed the voice signal of other terminal device 14 in the belonging master group and the voice signal of all the slave groups is transferred to the terminal device 14 belonging to the master group. Furthermore, the voice signal mixed the voice signal of other terminal device 14 in the belonging slave group and the voice signal of the master group is transferred to the terminal device 14 belonging to the slave group.

An operation of the server 11 is described as follows. When the server 11 receives the voice signal from one or plurality of the calling terminal devices 14 belonging to the master group, the received voice signal is transferred to other terminal device 14 in the talk group TG to which the calling terminal device 14 belongs and the terminal device 14 belonging to the slave group. When the server 11 receives the voice signal from one or a plurality of the calling terminal devices 14 belonging to the slave group, the received voice signal is transferred to other terminal device 14 in the talk group TG to which the calling terminal device 14 belongs and the terminal device 14 belonging to the master group.

The group calling from the terminal device 14 (001) belonging to the talk group TG1 is, for example, transferred to other terminal devices 14 (002 and 003) belonging to the talk group TG1 and the terminal devices 14 belonging to the talk group TG2 and TG3 which are the slave groups (011, 012, 013, 021, 022, and 023). Namely, the voice signal from the terminal device 14 (001) is transferred to other terminal devices (002 and 003) and the terminal devices 14 (011, 012, 013, 021, 022, and 023). The group calling from the terminal device belonging to the talk group TG2 (011) is transferred to other terminal devices 14 (012 and 013) belonging to the talk group TG2 and the terminal devices 14 (001, 002 and 003) belonging to the talk group TG1 which is the master group. Namely, the voice signal from the terminal device 14 (011) is transferred to other terminal devices (012 and 013) and the terminal devices 14 (001, 002 and 003) belonging to the talk group TG1.

The server 11 generates a mixing group (communication session) for each of the talk groups TG so as to perform mixing and transfer in the abovementioned group communication.

At first, a description in case of receiving the voice signal (a calling voice packet of the group communication) from the calling terminal device 14 belonging to the master group will be given. The server 11 generates the mixing group to which all the terminal devices 14 in the slave group belong in relation to the mixing group to which all the terminal devices 14 in the master group belong and in relation to each of all the slave groups subordinating to the master group. The voice signal of all the terminal devices 14 belonging to the mixing group is then mixed for every mixing group in the group communication started with this calling voice packet.

The terminal device 14 not transmitting the voice signal in the master group is transferred the voice signal mixed of the voice signal which is a mixed voice signal of all the terminal devices 14 of the mixing group in the master group and the voice signal which is the mixed voice signal of all the terminal devices 14 of the mixing group in each of the slave groups.

The calling terminal device 14 in the master group is transferred the voice signal mixed of the voice signal which is the mixed voice signal of all the terminal device 14 in the master group other than the voice signal transmitted from own calling terminal device 14 (echo elimination mixing) and the voice signal which is the mixed voice signal of all the terminal devices 14 of the mixing group in each of the slave groups.

The terminal device 14 not transmitting the voice signal in each of the slave groups is transferred the voice signal mixed of the voice signal which is the mixed voice signal of all the terminal devices 14 of the mixing group in a belonging slave group and the voice signal which is the mixed voice signal of all the terminal devices 14 of the mixing group in the master group.

The calling terminal device 14 in each of the slave groups is transferred the voice signal mixed of the voice signal which is the mixed voice signal of all the terminal devices 14 of the mixing group in a belonging slave group other than the voice signal transmitted from own calling terminal device 14 (echo elimination mixing) and the voice signal which is the mixed voice signal of all the terminal devices 14 of the mixing group in the master group.

Then, the description in case of receiving the voice signal (the calling voice packet in the group communication) from the calling terminal device 14 belonging to the slave group will be given. The server 11 generates the mixing group to which all the terminal devices 14 in this slave group belong and the mixing group to which all the terminal devices 14 in the master group belong. The voice signal of all the terminal devices 14 belonging to the mixing group is mixed for every mixing group.

The terminal device 14 not transmitting the voice signal in the slave group is transferred the voice signal mixed of the voice signal which is the mixed voice signal of all the terminal devices 14 of the mixing group in the slave group and the voice signal which is the mixed voice signal of all the terminal devices 14 of the mixing group in the master group.

The calling terminal device 14 in the slave group is transferred the voice signal mixed of the voice signal which is the mixed voice signal of all the terminal devices 14 of the mixing group in the master group other than the voice signal transmitted from own calling terminal device 14 (echo elimination mixing) and the voice signal which is the mixed voice signal of all the terminal devices 14 of the mixing group in the master group.

The terminal device 14 not transmitting the voice signal in the master group is transferred the voice signal mixed of the voice signal which is the mixed voice signal of all the terminal devices 14 of the mixing group in the master group and the voice signal which is the mixed voice signal of all the terminal devices 14 of the mixing group in the slave group.

The calling terminal device 14 in the master group is transferred the voice signal mixed of the voice signal which is the mixed voice signal of all the terminal devices 14 of the mixing group in the master group other than the voice signal transmitted from own calling terminal device 14 (echo elimination mixing) and the voice signal which is the mixed voice signal of all the terminal devices 14 of the mixing group in the slave group.

Besides, when the calling for the plenary communication is performed, the mixing group is made for every talk group TG, irrespective of the master-slave relationship, and then the mixing and transfer to each of the terminal devices 14 is performed in each of the mixing groups. The voice signal mixed in each of the mixing groups is further transferred among all of the mixing groups and this transferred voice signal is attached to the voice signal to be mixed and transferred.

FIG. 6A is a diagram showing the call destination table provided in the storage unit 31 in the server 11. The server 11 determines the transfer destination of the voice signal (voice data) included in the voice packet by retrieving the call destination table with a communication type and the call destination ID included in the communication control information in the voice packet in receiving the voice packet from the terminal device 14.

The call destination table includes the calling type, the call destination ID, a terminal information and the master-slave relationship. The calling type is information for classifying an individual calling, the group calling and a plenary calling. The call destination ID is information for identifying the terminal device 14 of the communication partner or the talk group TG. The terminal ID which is identification information for the terminal device 14 of the communication partner becomes the call destination ID in the individual calling. Namely, registration of the terminal information is not always required as the call destination ID and the terminal information are same. The group number attached to the talk group TG (the number started from TG in this embodiment) becomes the call destination ID in the group calling. The talk group TG1, TG2, and TG3 showed in FIG. 5 is set in FIG. 6A. The terminal information and the master-slave relationship are information indicating the transfer destination for the voice signal. The terminal information is the terminal number of the terminal device 14 which is a distribution destination (communication partner) of the voice signal. The master-slave relationship is information specifying the master-slave relationship of each of the talk groups TG as described above has blanks other than a column of the group calling.

The plenary communication is treated as the group communication to which all the terminal devices 14 belong. The master-slave relationship is not set in the plenary communication as all the communicable terminal devices 14 at that time are targeted for the communication.

FIG. 6B is a diagram showing the mixing table. The mixing table has a plurality of columns and stores information of one communication session (mixing group) in each of the columns. The communication session means the status the voice signal is mutually transferred between a plurality of the terminal device 14 via the server 11 as a relaying device herein. The server 11 manages the terminal device 14 participating in each of the communication sessions by the mixing table.

The communication session is processed with following procedure, for example. When receiving a first calling voice packet to establish the communication session from the terminal device 14, the communication session is established, in other words, the mixing group is set, in accordance with the calling destination table. One speech voice (few seconds, for example) is divided into and transceived with some short voice packets (20 milliseconds in this embodiment). The speech voice replying to a certain speech voice is transmitted from other terminal device in the communication session. The interval between former speech voice and the replying speech voice (silent time) is approximately 0 second to few seconds. A hold time of the communication session should be set longer than the longest silent time of general communication.

A session ID, a participation ID, the master-slave relationship and the hold time TS are stored correlatively in the mixing table for each of the communication sessions. The information in relation to the communication session of each column in the mixing table is produced by the server 11 corresponding to the transmission of first voice packet (calling voice packet) from the calling terminal device 14 to the server 11.

A session ID is a number identifying the communication session. The identification number of the communication partner (terminal number/group number/plenary number) written in the abovementioned first voice packet is used for the session ID. The communication session to which the terminal number ("033", for example) is registered as the session ID is the communication session of the individual communication (individual communication session). The communication session to which the group number ("TG1", for example) is registered as the session ID is the communication session of the group communication (group communication session). When the identification number of the communication partner written in the first voice packet is the group number, the communication session of the talk group TG having the master-slave relationship with the talk group TG of this group number as well as the communication session of this group number are made. For example, when the identification number of the communication partner written in the first voice packet is the group number "TG1" (master group), the communication sessions of the group number "TG2" and "TG3" (slave groups) are made along with the communication session of the group number "TG1".

The communication session to which the serial number ("A", for example) is registered as the session ID, although not existing the mixing table of FIG. 6B, further becomes the communication session of the plenary communication (plenary communication session).

The participation ID is a list of the terminal number of the terminal device 14 participating in the communication session. When the voice packet is transmitted from a certain terminal device 14 of which the terminal number is registered in the participation ID, the server 11 transmits the voice signal of this voice packet to other terminal device of which the terminal number is registered in the participation ID and then the mutual communication between participating terminal devices are realized.

In the individual communication session, the participation ID is only the terminal number of the calling terminal device 14 and the terminal device 14 of the communication partner.

In the group communication session, the participation ID is the terminal number of the terminal device 14 belonging to the talk group TG. However, even if belonging to the talk group TG, the terminal device 14 which is not active or participates in another communication session can not participate in this group communication session, whose terminal numbers are excluded from the participating ID. The master-slave relationship is a master-slave relationship of the communication session in the group communication (mixing group in the talking group TG).

In the plenary communication session, the participation ID includes the terminal number of the calling terminal device 14 and all the communicable terminal devices 14.

The hold time TS is time holding the communication session without releasing after the voice packet is not transmitted from the participating terminal devices. The hold time TS of each communication session is set to 30 seconds (count value: 1500), for example, in the server 11. The server 11 counts a lapse of the hold time TS when the voice packet is not transmitted from any of the participating terminal devices. When the hold time TS is up without transmission of the voice packet from any of the participating terminal devices for 30 seconds, this communication session is released and information of this communication session is deleted from the mixing table.

In the embodiment, the group communication session is released only in case of lapsing the hold time TS of other group communication session having the master-slave relationship as well as the own hold time TS. In FIG. 6B, to make the communication session of the talk group TG1 released, the hold time of the talk groups TG2 and TG3 in addition to the hold time TS of the own talk group (TG1) must be up. The hold time of the talk group TG1 in addition to the own (TG2) hold time TS must be up for making the talk group TG2 released, for example.

When the new group communication session is established, the terminal device 14 cannot participate in newly established group session in the any case of following conditions, as described above: the terminal device 14 belonging to the talk group TG performs the individual communication session with other terminal device 14, or performs the group communication in another talk group TG. The terminal device 14 is to belong to a plurality of the talk groups TG and abovementioned situation can be happened when the terminal device 14 belongs to the user group having set later while belonging to certain fixed group. Moreover, when the system administrator sets the fixed group, the abovementioned situation can be happened in making the terminal device 14 belong to a plurality of the fixed groups. When the terminal device 14 belongs to a plurality of the talk groups TG, the server 11 decides to which communication session the terminal device 14 is made to belong.

One terminal device 14 may further participate in only one talk group TG to avoid collision between the group communication. In this case, the terminal device 14 belonging to the group may be made to leave from the talk group having already belonged when new talk group TG (user group, fixed group) is made.

Figure 7:
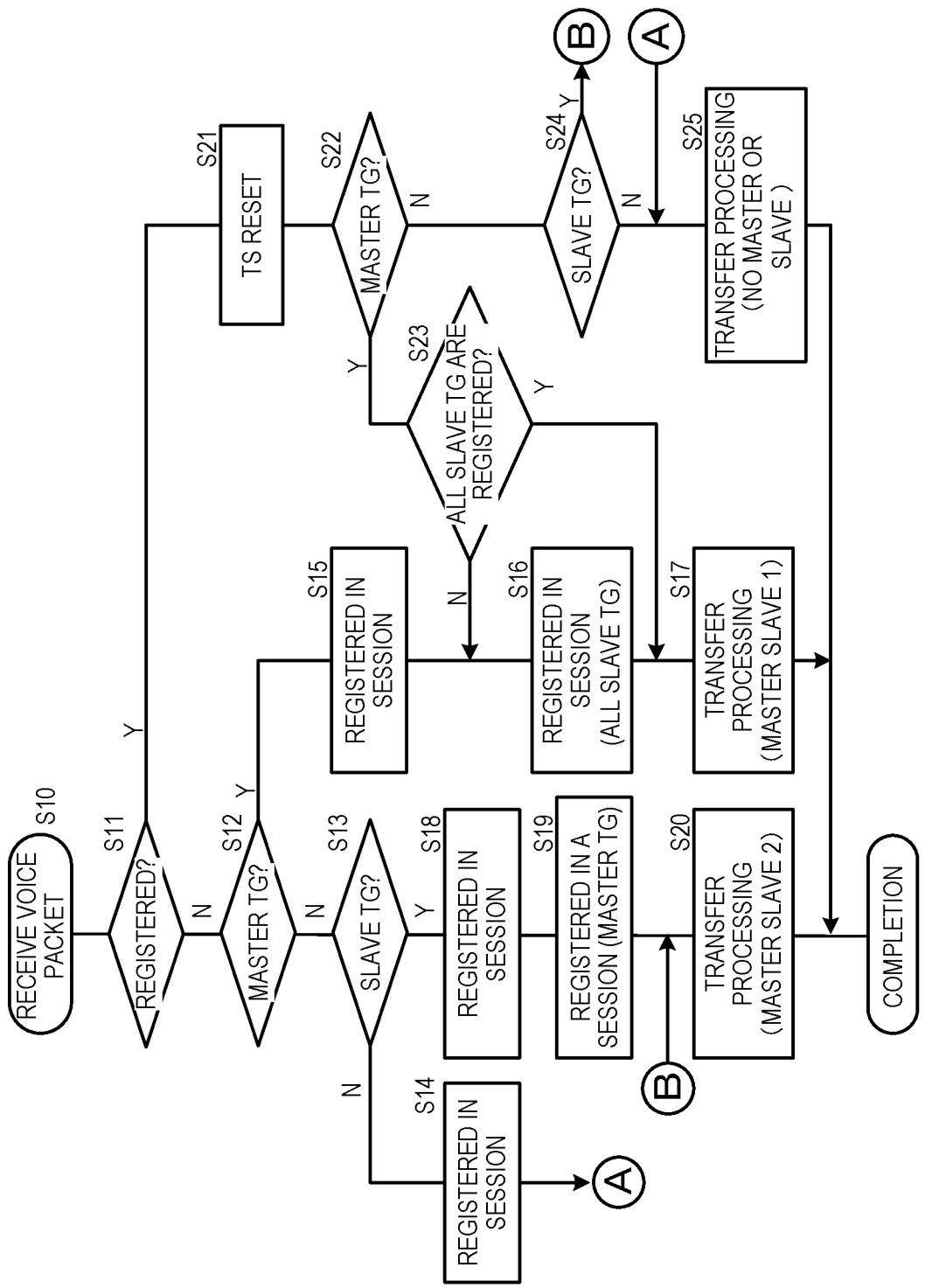
FIG. 7 shows a flow chart of a server process in receiving the voice packet (voice signal).

FIG. 7 is a flow chart showing an operation when the server 11 receives the voice packet (voice signal).

When the server 11 receives the voice packet from the terminal device 14 (S10), the server 11 decides whether the communication session (mixing group) identified by the calling source ID, calling type and the call destination ID has already registered in the mixing table or not (S11).

If the communication session is not registered to the mixing table (NO in S11), that is this voice packet is the calling voice packet, the server 11 performs the processing to register this new communication session to the mixing table after S12.

The server 11 decides whether this new communication session is the communication session of the master group or not in accordance with the calling type and the calling ID (S12). If the communication session is not the communication session of the master group (No in S12), the server 11 similarly decides whether the new communication session is the communication session of the slave group or not (S13). If the communication session is not the communication session of the slave group (NO in S13), the server 11 decides the new communication session is the individual communication session or the plenary communication session and registers the new communication session to the mixing table (S14). The call destination ID is then registered as the session ID. The call destination ID and the calling source ID are registered as the participation ID in the individual communication. The terminal ID of all the terminal devices 14 are registered in the plenary communication session. Besides, the terminal number is excluded from a column of a participation terminal number if there is the terminal device which cannot participate in this communication session if the terminal device is non-active or participates in other communication session.

The server 11 then performs the transfer processing of the registered communication session (S25).

The server 11, in particular, decides the transfer destination of the voice signal included in the voice packet, makes the voice packet and transfers this voice signal toward the decided transfer destination. The voice signal in the voice packet is transferred to a different terminal device 14 from the terminal device 14 having transmitted the voice packet in accordance with the participation ID in the individual communication session. In the plenary communication session, other voice signal is mixed in order to adapt each transfer destination in accordance with the participation ID and the voice packet describing the communication control information adapted to each of the group communications is made.

Subsequently in S12, when this new communication session is the communication session of the master group (YES in S12), the server 11 registers this new communication session as the communication session of the master group (S15). The call destination ID (group number) is then registered as the session ID and further registered as the master in the master-slave relationship. Moreover, the server 11 registers the communication session of all the slave groups subordinating to this new communication session in accordance with the calling destination table (S16). The group number of each of the slave groups and the fact of being slave in the master-slave relationship is registered in the session ID of the communication session in each of the slave groups.

The server 11 then performs the transfer processing for the registered communication session (S17).

The server 11, as mentioned above, mixes the voice signal of all the belonging terminal devices 14 for the communication session of the main group and the communication session of each slave group, respectively. The mixed voice signal of the communication session of the master group and the mixed voice signal of the communication session of each slave group are then mixed and transferred in accordance with each transfer destination.

Subsequently in S13, when this new communication session is the communication session of the slave group (YES in S13), the server 11 registers this new communication session as the communication session of the slave group (S18). The call destination ID (group number) is then registered as the session ID and registered as the slave in the master-slave relationship. Moreover, the server 11 registers the communication session of the master group to which this new communication session subordinates in accordance with the calling destination table (S19). The session ID of the communication session of the master group is then registered the group number of the master group and further registered as the master in the master-slave relationship.

The server 11 then performs the transfer processing of the registered communication session (S20). The server 11 mixes the voice signal of belonging all the terminal devices 14 for each of the communication session of the slave group and the communication session of the master group as described above. The mixed voice signals of the communication session of the slave group and the mixed voice signal of the communication session of the master group are mixed and then transferred responsive to each of the transfer destinations.

Subsequently in S22, when this communication session has already registered to the mixing table (YES in S11), the server 11 resets the hold time TS of this communication session to 1500 (30 seconds) (S21). The server 11 then decides whether the communication session is the communication session of the master group or not in accordance with the calling type and the calling ID (S22). When the communication session is the communication session of the master group (YES in S22), the server 11 decides whether all the communication sessions of the slave group subordinating to this communication session (master group) are registered to the mixing table or not (S23). When all the communication sessions of slave group are not registered (NO in S23), the server 11 makes the processing move to S16 and registers the communication session of the slave group which has not registered. On the other hand, when all the communication sessions of the slave group have registered (YES in S23), the server 11 moves the processing to S17.

Moreover in S22, when this communication session is not the communication session of the master group (NO in S22), the sever device 11 similarly decides whether the communication session is the communication session of the slave group or not (S24). When the communication session is the communication session of the slave group (YES in S24), the server 11 makes the processing move to S20. On the other hand, when the communication session is not the communication session of the slave group (NO in S24), the server 11 makes the processing move to S25.

Figure 8:
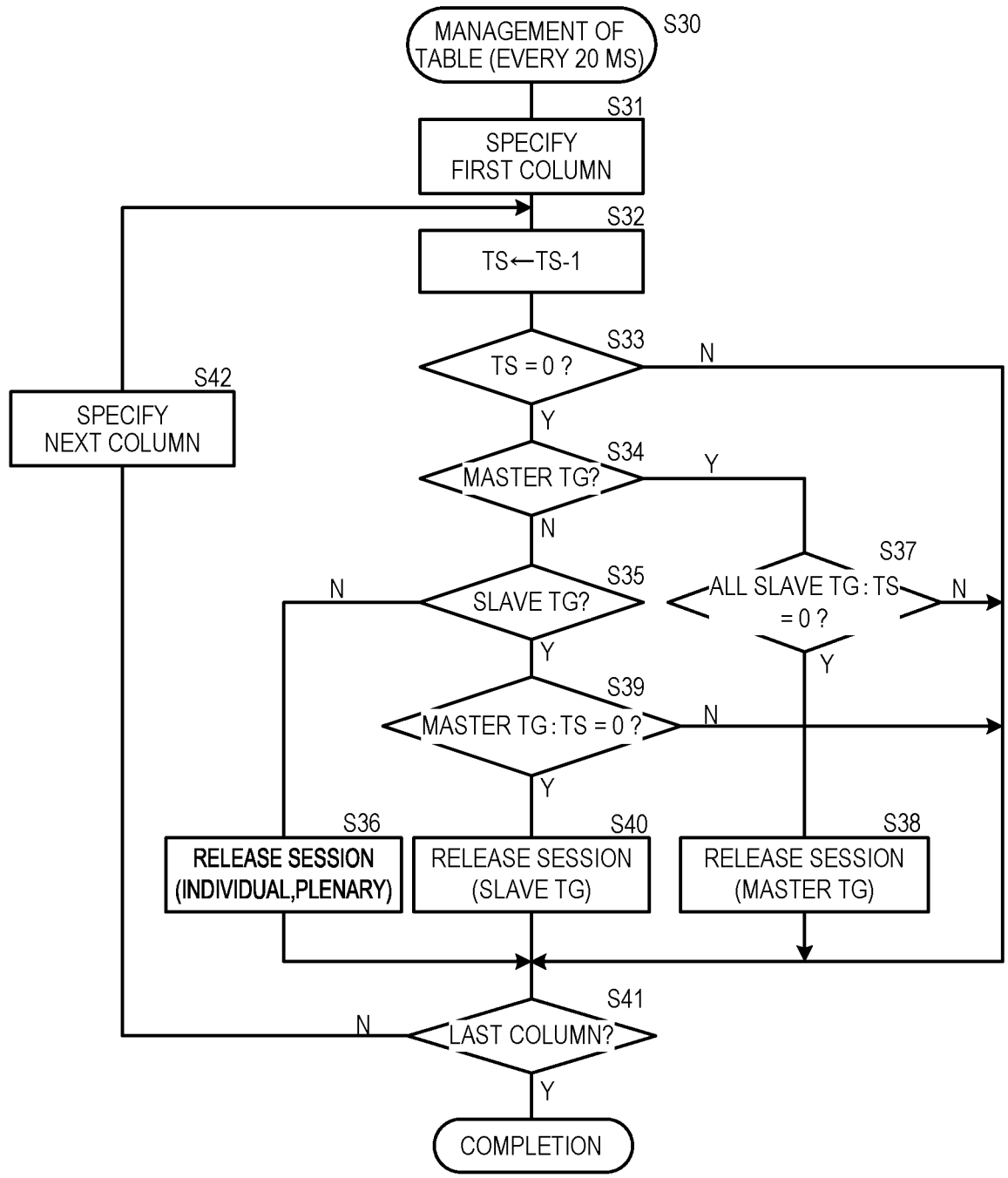
FIG. 8 shows a flow chart of a mixing table management process of the server 11.

FIG. 8 is a flow chart showing a mixing table management processing operation of the server 11. The management processing operation is repeatedly performed regularly (every 20 milliseconds, for example). The server 11, when 20 milliseconds have passed (S30), specifies the communication session of the first column of the mixing table (S31). The column of the session ID "033" is the first column in FIG. 6B, for example. Subsequently, the server 11 subtracts one count from the holding time TS (for 20 milliseconds) (S32), decides if the hold time TS became 0 by this subtraction (S33). When the hold time TS is not 0 (NO in S33), the server 11 make the processing move to S41.

On the other hand, when the hold time TS becomes 0 (YES in S33), the server 11 decides if this communication session is the communication session of the master group (S34). When the communication session is not the communication session of the master group (NO in S34), the server 11 decides if this communication session is the communication session of the slave group (S35). When the communication session is not the communication session of the slave group (NO in S35), the server decides this communication session is the individual communication session or the plenary communication session and this communication session is released (S36).

Subsequently in S34, when the communication session is the communication session of the master group (YES in S34), the server 11 decides whether the hold time TS of the communication session of all the slave groups registered in the mixing table becomes 0 or not (S37). When the hold time TS of the communication session of all the slave groups is not 0 (NO in S37), the server 11 make the processing move to S41. On the other hand, when the hold time TS of the communication session of all the slave groups become 0

(YES in S37), the server 11 releases this communication session of being the master group (S38).

Subsequently in S35, when the communication session is the communication session of the slave group (YES in S35), the server 11 decides if the hold time TS of the communication session of the master group becomes 0 (S39). When the hold time TS is not 0 (NO in S39), the server 11 make the processing move to S41. On the other hand, when the hold time TS becomes 0 (YES in S39), the server 11 releases this communication of being the slave group (S40). The server 11 further performs management of the mixing group by performing abovementioned processing until the last column of the mixing table in order (S41, S42).

Consequently in the group communication, the calling and the listening are enabled by setting the master-slave relationship to a plurality talk groups TG, mixing the voice signal of each of the talk groups having the master-slave relationship and transferring the voice signal to each of the talk groups TG.

In the embodiment, as the present invention is realized as a result that the server 11 stores the master-slave relationship of each of the talk groups TG and makes the mixing group of each of the talk groups TG and the like, the present invention is applied without changing control of an existed terminal device 14.

Besides, in the embodiment, the transfer means are composed of, but not limited to, making the mixing group of each of the talk groups TG and transferring the voice signal to the terminal device 11 of each of the talk groups TG.

Moreover in the embodiment, the master-slave relationship of two hierarchical layers to which two slave groups subordinate for one master group, but not especially limited to. The master-slave group relationship may be three hierarchical layers, for example. The slave group (talk group TG 4) subordinating to the talk group TG2 may be set, for example. Moreover, in the embodiment, although the master group of 1 is only set, a plurality of the talk groups may be set. The number of the slave groups subordinating to the master group of 1 and the number of the terminal devices 14 belonging to the talk group TG of 1 are not especially limited and can be set optionally.

Although the voice communication system 10 of abovementioned embodiment further uses LAN as the network 17, the network 17 is not limited to LAN. The network using Internet or LTE (Long Term Evolution) may be used, for example.

Figure 9:
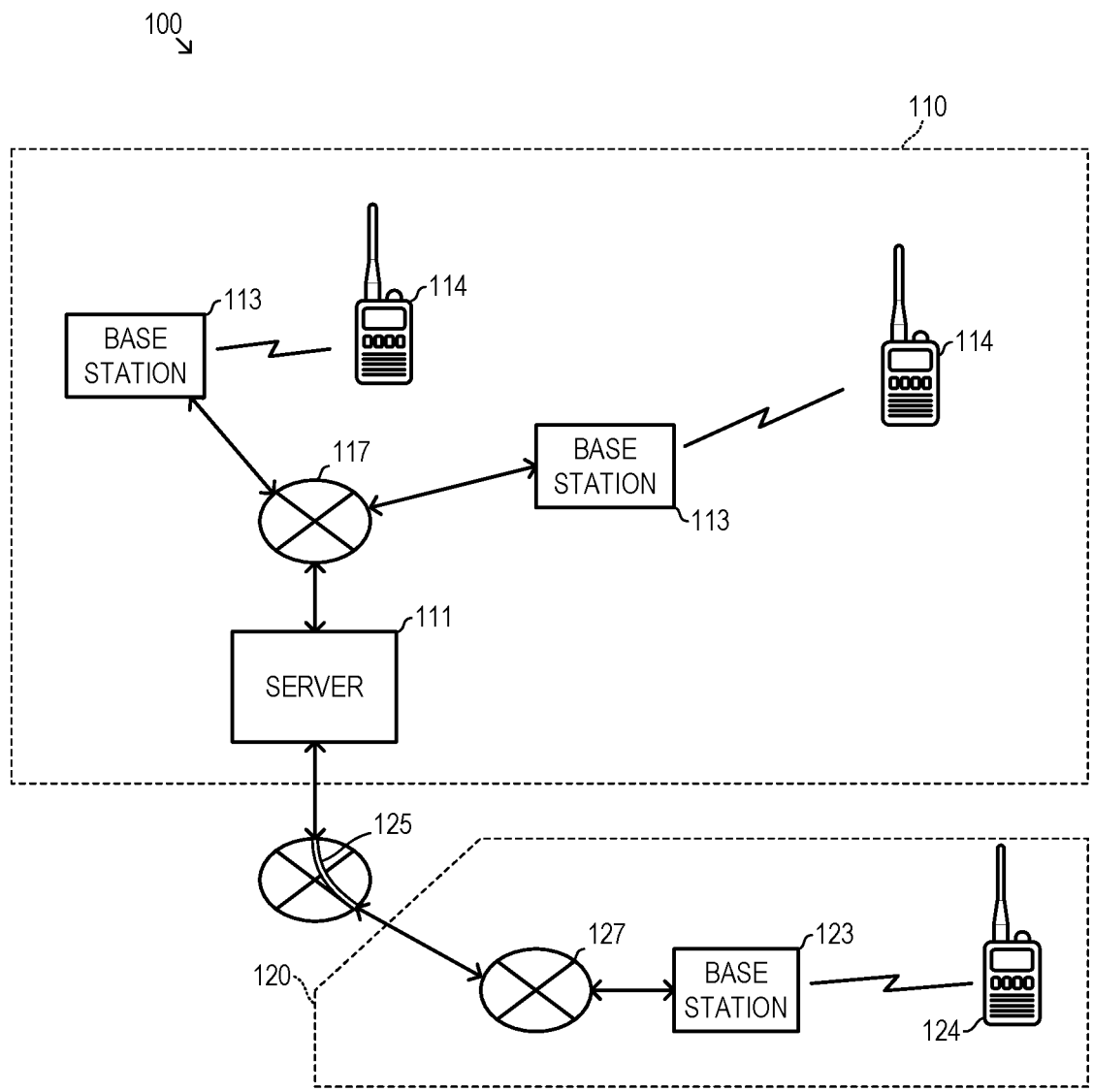
FIG. 9 shows an example of a voice communication system using an LTE network.

An example of the voice communication system using LTE network is shown in FIG. 9. The voice communication system 100 is built by using two LTE network 117, 127 on different carriers in this example. The server 111 is provided in a system 110 in a first network 117 (LTE network of first carrier). The server 111 is connected to a second network 127 (LTE network of second carrier) via a VPN 125. The first and second network 117, 127 are connected to base stations 113, 123, respectively. The terminal device 114 having the first carrier specification communicates with the server 111 via the base station 113. The terminal device 124 having the second carrier specification communicates with the server 111 via the base station 123. Although the voice communication system 100 is built by using the LTE network 117, 127 on two carriers in this diagram, the voice communication system can be also built by using one network. The voice communication system according to the present invention can be consequently built by using the network other than LAN.

The voice communication system may be further built by using a plural kinds of network such as LAN, LTE network and internet. When the plural kinds of network are used in the voice communication system, the gateways may connect between each of networks and the voice packet may be relayed.

REFERENCE NUMERALS

10 voice communication system (over LAN)
11 sever device (relaying device)
12 management device
13 wireless access point
14 terminal device
20 control unit (for terminal device)
30 control unit (for server)
32 network communication unit
100 voice communication system (using LTE network)
220 PTT (push to talk) switch
TG talk group

What is claimed is:

1. A relaying device comprising:
a network communication unit connected to a communication network and communicating with a plurality of terminal devices over the communication network,
a storage unit storing information of a plurality of groups and the terminal devices belonging to each of groups, and
a control unit, in receiving a voice signal from a calling terminal device which is a terminal device sending the voice signal in first, transferring the voice signal to a remaining terminal device, which is the terminal device other than the calling terminal device in a group to which the calling terminal device belongs; wherein
the storage unit further stores a master-slave relationship of the plurality of groups,
the control unit further transfers the voice signal to the terminal device belonging to a master group when the group to which the calling terminal device belongs is a slave group and further transfers the voice signal to the terminal device belonging to the slave group when the group to which the calling terminal device belongs is the master group,
the storage unit stores the master-slave relationship associated one or a plurality of slave groups with one master group,
the control unit transfers the voice signal received from the calling terminal device belonging to the master group to the terminal devices belonging to all the slave groups subordinating to the master group,
the control unit:
generates a first communication session in which all the terminal devices belonging to the master group participate and the same number of second communication sessions as the slave groups subordinating to the master group when the control unit receives the voice signal from the calling terminal device belonging to the master group, wherein each of the second communication sessions is participated by all the terminal devices belonging the respective slave group subordinating to the master group,
transfers the voice signal to the remaining terminal device in the master group over the first communication session, and
inputs the voice signal to all the second communication sessions and transfers the voice signal to all the terminal devices in each of the slave groups over the second communication sessions; and the control unit:
generates a third communication session of the slave group and a fourth communication session of the master group to which the slave group is subordinate when the voice signal is received from the calling terminal device belonging to the slave group,
transfers the voice signal to the remaining terminal device in the slave group over the third communication session, and
inputs the voice signal to the fourth communication session and transfers the voice signal to all the terminal devices in the master group over the fourth communication session.

2. The relaying device according to claim 1 wherein; the control unit releases the first and fourth communication sessions when the control unit does not receive the voice signal for a predetermined time from any of the terminal devices belonging to the master group and all of the slave groups and
releases the second and third communication sessions when the control unit does not receive the voice signal for a predetermined time from any of the terminal device belonging to the slave group and the master group.

3. A voice communication system comprising:
a relaying device storing information of a plurality of groups and a terminal device belonging each of group and in receiving a voice signal from a calling terminal device which is a terminal device sending the voice signal in first, transferring the voice signal to a remaining terminal device, which is the terminal device other than the calling terminal device in a group to which the calling terminal device belongs, and
a plurality of the terminal devices connected to the relaying device over a communication network; wherein
the relaying device further stores a master-slave relationship of the plurality of the groups,
the relaying device further transfers the voice signal to the terminal device belonging to the master group when the group to which the calling terminal device belongs is the slave group and further transfers the voice signal to the terminal device belonging to the slave group when the group to which the calling terminal device belongs is the master group,
the storage unit stores the master-slave relationship associated one or a plurality of slave groups with one master group,
the control unit transfers the voice signal received from the calling terminal device belonging to the master group to the terminal devices belonging to all the slave groups subordinating to the master group,
the control unit:
generates a first communication session in which all the terminal devices belonging to the master group participate and the same number of second communication sessions as the slave groups subordinating to the master group when the control unit receives the voice signal from the calling terminal device belonging to the master group, wherein each of the second communication sessions is participated by all the terminal devices belonging the respective slave group subordinating to the master group,
transfers the voice signal to the remaining terminal device in the master group over the first communication session, and
inputs the voice signal to all the second communication sessions and transfers the voice signal to all the terminal devices in each of the slave groups over the second communication sessions; and
the control unit:
generates a third communication session of the slave group and a fourth communication session of the master group to which the slave group is subordinate when the voice signal is received from the calling terminal device belonging to the slave group,
transfers the voice signal to the remaining terminal device in the slave group over the third communication session, and
inputs the voice signal to the fourth communication session and transfers the voice signal to all the terminal devices in the master group over the fourth communication session.

4. A transfer method of a voice signal comprising:
a network communication unit connected to a communication network and communicating with a plurality of terminal devices over the communication network, and
a storage unit storing information of a plurality of groups a terminal device belonging to each of the groups, and a master-slave relationship of the plurality of the group; wherein
a relaying device, in receiving a voice signal from a calling terminal device which is a terminal device sending the voice signal in first, transferring the voice signal to a remaining terminal device, which is the terminal device other than the calling terminal device in a group to which the calling terminal device belongs further transfers the voice signal to the terminal device belonging to a master group when the group to which the calling terminal device belongs is a slave group and further transfers the voice signal to the terminal device belonging to the slave group when the group to which the calling terminal device belongs is the master group,
the storage unit stores the master-slave relationship associated one or a plurality of slave groups with one master group,
the control unit transfers the voice signal received from the calling terminal device belonging to the master group to the terminal devices belonging to all the slave groups subordinating to the master group,
the control unit:
generates a first communication session in which all the terminal devices belonging to the master group participate and the same number of second communication sessions as the slave groups subordinating to the master group when the control unit receives the voice signal from the calling terminal device belonging to the master group, wherein each of the second communication sessions is participated by all the terminal devices belonging the respective slave group subordinating to the master group,
transfers the voice signal to the remaining terminal device in the master group over the first communication session, and
inputs the voice signal to all the second communication sessions and transfers the voice signal to all the terminal devices in each of the slave groups over the second communication sessions, and
the control unit:
generates a third communication session of the slave group and a fourth communication session of the master group to which the slave group is subordinate when the voice signal is received from the calling terminal device belonging to the slave group, transfers the voice signal to the remaining terminal device in the slave group over the third communication session, and inputs the voice signal to the fourth communication session and transfers the voice signal to all the terminal devices in the master group over the fourth communication session.

5. A non-transitory computer-readable recording medium storing a program for causing a control unit of a relaying device, wherein a network communication unit of the relaying device is connected with a communication network and communicating with a plurality of terminal devices over the communication network, and a storage unit of the relaying device stores information of a plurality of groups, a terminal device belonging to each of the groups, and a master-slave relationship of the plurality of the groups; wherein the program makes the control unit of the relaying device function as a group communication means, the control unit of the relaying device, in receiving a voice signal from a calling terminal device which is a terminal device sending the voice signal in first, transferring the voice signal to a remaining terminal device which is the terminal device other than the calling terminal device in a group to which the calling terminal device belongs further transfers the voice signal to the terminal device belonging to a master group when the group to which the calling terminal device belongs is a slave group and further transfers the voice signal to the terminal device belonging to the slave group when the group to which the calling terminal device belongs is the master group, the storage unit stores the master-slave relationship associated one or a plurality of slave groups with one master group, the control unit transfers the voice signal received from the calling terminal device belonging to the master group to the terminal device belonging to all the slave groups subordinating to the master group, the control unit:

generates a first communication session in which all the terminal devices belonging to the master group particiate and the same number of second communication sessions as the slave groups subordinating to the master group when the control unit receives the voice signal from the calling terminal device belonging to the master group, wherein each of the second communication sessions is participated by all the terminal devices belonging the respective slave group subordinating to the master group, transfers the voice signal to the remaining terminal device in the master group over the first communication session, and inputs the voice signal to all the second communication sessions and transfers the voice signal to all the terminal devices in each of the slave groups over the second communication sessions; and the control unit:

generates a third communication session of the slave group and a fourth communication session of the master group to which the slave group is subordinate when the voice signal is received from the calling terminal device belonging to the slave group, transfers the voice signal to the remaining terminal device in the slave group over the third communication session, and inputs the voice signal to the fourth communication session and transfers the voice signal to all the terminal devices in the master group over the fourth communication session.

\* \* \* \* \*